Oct. 12, 1965   K. EICKMANN   3,211,399
AIRCRAFT DRIVEN OR BORNE BY A PLURALITY OF HYDRAULIC MOTORS
WITH SUBSTANTIALLY EQUAL OR PROPORTIONAL ROTARY VELOCITY
Filed Sept. 20, 1963   3 Sheets-Sheet 3

INVENTOR.
KARL EICKMANN
BY
McGlew & Toren
ATTORNEYS.

United States Patent Office

3,211,399
Patented Oct. 12, 1965

3,211,399
AIRCRAFT DRIVEN OR BORNE BY A PLU-
RALITY OF HYDRAULIC MOTORS WITH
SUBSTANTIALLY EQUAL OR PROPORTION-
AL ROTARY VELOCITY
Karl Eickmann, 2420 Isshiki, Hayama-machi,
Kanagawa-ken, Japan
Filed Sept. 20, 1963, Ser. No. 310,263
11 Claims. (Cl. 244—17.23)

This invention relates to aircraft which may take off or land horizontally or vertically and which are operated by a plurality of propellers driven by hydraulic motors.

Hydraulic motors are known in the art. It would therefore be simple to drive propellers of aeroplanes or rotors of helicopters by hydraulic motors. However, such a hydraulic motor drive alone would not necessarily be sufficient for the stabilized movement or hovering of the aircraft.

Due to communications and leakages of the hydraulic system the propellers of such aircrafts might rotate with different rotary velocities. For example, the propellers of the aircraft might be subjected to different loading and therefore a certain leakage, resulting in slip, might occur in the hydraulic systems and might cause some of the propellers to rotate with a more or less rotary velocity than others. Such drawbacks would cause the aircraft to lose its stable position during rest or travel through or in the air or during take off or landing.

In order to overcome these drawbacks this invention provides an aircraft which is driven or which is borne by a plurality of propellers which are driven by hydraulic motors with substantially parallel or substantially equal rotary velocity.

It is therefore an object of this invention to provide an aircraft which is driven or borne by a plurality of propellers or rotors which are driven by hydraulic motors with substantially equal or proportional rotary velocities.

It is another object of this invention to provide an aircraft which is driven or borne by propellers or rotors which are driven by a plurality of hydraulic pumps producing a plurality of hydraulic flows which drive each one, or a plurality of, hydraulic motors which directly rotate propellers of the aircraft.

Still another object of the invention is to provide a cycle of hydraulic flows from fluid flow producing means, such as a hydraulic fluid pump or a fluid flow producing combustion engine, to a first hydraulic motor and out from the first hydraulic motor into a second hydraulic motor and out from the second hydraulic motor back to the fluid flow producing means or to an additional hydraulic motor or hydraulic motors and thereafter back to the fluid flow producing means.

Also an object of the invention is to drive or fasten propellers or rotors directly from or on the shafts of hydraulic motors.

Another object of the invention is to provide a helicopter or an aircraft with a plurality of rotors or propellers which are driven by hydraulic motors which are so arranged and operated that the helicopter or aircraft is maintained under all circumstances in a stable condition during operation.

Still another object of the invention is to provide a skeleton of the aircraft which consists of pipes or tubes only and whereon the hydraulic motors are fastened on said pipes or tubes and wherein the cabin of said aircraft or helicopter is also fastened on said pipes or tubes and wherein the flow of fluid or flows of fluid to and from the hydraulic motor or motors which drive the propellers flows or flow through at least a part of said pipes or tubes.

It is another object of this invention to provide hydraulic motors with propellers on an aircraft or on a helicopter which can be taken in, or which can be swung into or on, the aircraft so that the aircraft might be able to run as a vehicle on land or water.

And it is still a further object of the invention to provide at least one horizontal propeller on an aircraft which is driven by a hydraulic motor which can be pivoted around an axis so that the thrust of the propeller can be changed into different directions.

More details, features and/or objects of this invention may become apparent from a study of the accompanying figures wherein.

In the drawings the pipes or tubes are shown partly in elevation and partly in section. The propellers and the fluid flow producing means such as the engines or combustion engines or pumps and/or hydro-fluid flow producing combustion engines are also shown in the figures by simplified sketches only because it is assumed that those skilled in the art can understand their probable structure and their operation.

In the detailed description hereafter there are some of my patents or copending patents cited which show for example what kind of engines, pumps, motors or hydraulic fluid flow producing combination engines might be provided in the aircraft. But the citing of these patents is by way of example only. It would also be possible to replace the hydraulic motors, hydraulic pumps or hydraulic fluid flow producing combustion engines by other modifications of others of my patents or by either oil hydraulic motors, hydraulic pumps or combustion engines.

Figure 1:
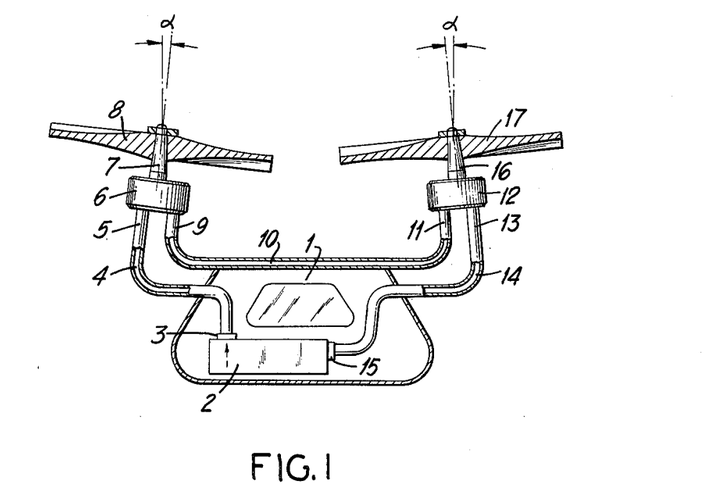
FIG. 1 presents a sectional view through an embodiment of an aircraft of this invention.
Figure 2:
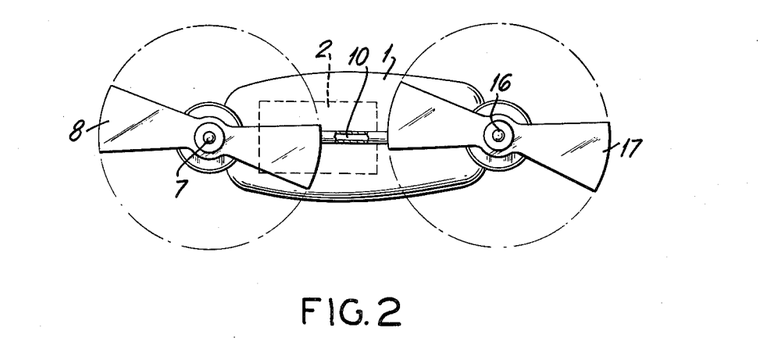
FIG. 2 is a view upon the aircraft of FIG. 1 from above.

In FIGS. 1 and 2, numeral 1 shows the passenger cabin or the body of the aircraft. Fluid flow producing means or engine 2 such as a combustion engine together with a hydraulic pump or a fluid flow producing combustion engine and the accessories which are necessary to the said pump or engine are indicated simplified by the numeral 2. Numeral 3 shows the exit port of the fluid flow producing means 2. During operation of the engine 2, a flow of hydraulic fluid under pressure to passed out from the pump flow exit port 3 through the flow delivery pipe or delivery tube 4 to the entrance port 5 of the first hydraulic motor and causes the rotary movement of the rotary parts in the first hydraulic motor 6 which is transmitted from the rotary parts of the first hydraulic motor 6 to the hydraulic motor shaft 7. A first propeller 8 is fixed on the said hydraulic motor shaft 7 and rotates therewith.

The hydraulic fluid leaves the first hydraulic motor 6 through the first hydraulic motor exit port 9 and flows thereafter through the connection pipe 10 into the entrance port 11 of the second hydraulic motor 12. The flow of fluid provides the rotary movement of the rotary parts and of the shaft 16 of the second hydraulic motor 12. A propeller 17 is fastened on the shaft 16 and rotates therewith. The flow of hydraulic fluid leaves the second hydraulic motor 12 through the exit port 13 of the second hydraulic motor 12 and flows thereafter through the back flow pipe or tube 14 to the pump flow inlet port 15 and therefore into the said pump or pumps or into the said hydraulic fluid flow producing means or engine 2. A fluid tank might be provided in the described cycle too.

The body of the passenger cabin 1 may be fastened and borne on the connection pipe 10. The first hydraulic motor 6 may directly be fastened and/or be borne on or by the flow delivery pipe 4 and the connection pipe 10. The second hydraulic motor 12 may be fastened on and/or borne by the connection pipe 10 and the backflow pipe 14. The method of fastening and/or bearing of the hydraulic motors 6 and 12 on the said tubes or pipe like the flow delivery pipe 4, the connection pipe 10 and the backflow pipe 14 is by way of example only. It would of course also be possible to fasten likewise the hydraulic motors 6 and 12 by bars or connection means of directly on the passenger cabin 1. The engine and pump or the fluid flow producing engine 2 is in the case of the figures shown as located on the bottom of the passenger cabin 1, but it would also be possible to provide the engine 2 on other suitable places.

The skeleton of the aircraft of FIGS. 1 and 2 has the special features that such kind of aircraft is most inexpensive, can be very quickly constructed, is very economical and also very sure and stable during hovering take off, or landing.

Since the fluid flows through the flow delivery tube 4 into the hydraulic motor 6 and leaves the hydraulic motor 6 and flows through conduit 10 and the second hydraulic motor 12 and thereafter leaves the second motor 12 and flows through the backflow pipe 14 back to engine 2, the same quantity of hydraulic fluid flows through the first hydraulic motor 6 as through the second hydraulic motor 12. Therefore both motors will run with the same rotary velocity provided they have an equal number of displacement chambers with equal volumes or they will will rotate with parallel or proportional rotary velocities if the displacement chambers in the first hydraulic motor 6 and the second hydraulic motor 12 are different. In the case of equal displacement chambers and equal sizes and locations of the parts in the first hydraulic motor 6 and the second hydraulic motor 12, the propellers 8 and 17 which are fastened on shafts 7 and 16 respectively are advantageously of similar or equal diameters and configurations.

The axes of the first and second hydraulic motors 6 and 12 and thereby the axes through the shafts 7 and 16 and through the propellers 7 and 17 may be inclined against each other substantially by an angle "alpha."

The inclination of the axis of the propellers 8 and 17 by the angle "alpha" provides the stability of the vehicle of FIGS. 1 and 2 in the air. It is known in the art that a propeller if its axis is not prefectly in the direction of the sum of the traction of the aircraft then the component of thrust of the propeller in a direction contrary to the traction will increase with an increase of the inclination angle "alpha." On the other hand the thrust of the respective propellers 8 or 17 will be at maximum if the axis of the respective propellers is without an angle of inclination "alpha" in the direction of the movement of the aircraft. From the above described also follows that, if the propellers 8 and 17 have axes which are inclined by an angle "alpha," then the vertical upward direction thrust is smaller than aircraft having a vertical propeller axis.

Thus, if the aircraft would be instable during its travel through the air and would incline respectively to the surface of the earth, then one of the propellers 8 or 17 would substantially become in a position wherein its axis would be substantially vertical to the surface of the earth while the other of the said propellers would get a bigger inclination of its angle to the normal and would thereby lose a certain thrust vertically to the surface of the globe.

The propeller which would have its axis vertically to the earth or to the planet's surface would be in the location of the high vertical thrust and would thereby move the sunken part of the aircraft upwards so that the aircraft again may receive its horizontal and stable location in the air. The inclination angle "alpha" of propellers 8 and 17 would therefore provide that in all cases where the aircraft might lose its substantial horizontal position, for instance, due to vertical winds, it would be moved into a substantial horizontal and stable position in the air.

Figure 3:
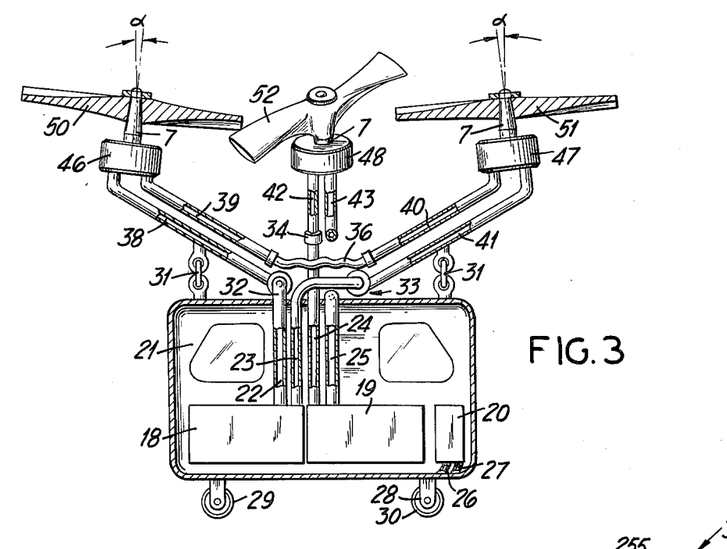
FIG. 3 presents a longitudinal sectional view through another embodiment of an aircraft according to this invention.
Figures 4, 4A:
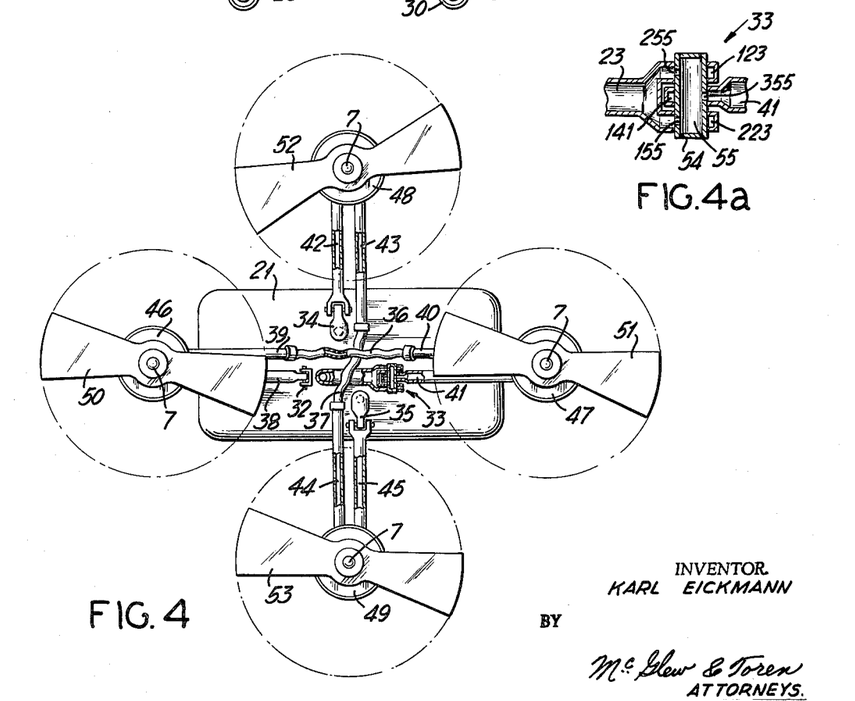
FIG. 4 shows a top view of the aircraft of FIG. 3.
FIG. 4a is an enlarged detail view of the mechanism indicated in FIG. 4.

In the embodiment of FIGS. 3 and 4, the numeral 21 shows the passenger cabin or the body of the aircraft. Preferably on the bottom of the passenger cabin or of the aircraft are the engines and hydraulic pumps or the fluid flow producing engines 18 and 19. Also provided is an additional combustion engine with hydraulic pump or fluid flow producing combustion engine or engines 20. Wheels 29 and 30 are carried below, or on, the body or passenger cabin 21 so that the aircraft can also run or move on the earth or on land as a vehicle.

A hydraulic motor or hydraulic motors 28 may be provided in order to drive the wheel or wheels 30 and pipes or tubes or other passage means 26 and 27 may be provided between the pump or fluid flow producing engine 20 and the hydraulic motor or hydraulic motors 28.

In the embodiment of the figure the flow delivery pipe or tube 26 may pass a flow of hydraulic fluid under pressure from the hydraulic pump or fluid flow producing engine 20 to the hydraulic motor or hydraulic motors 28 and the flow return pipe or tube 27 may pass the flow of fluid back from the said hydraulic motor or hydraulic motors 28 to the hydraulic pump or fluid flow producing engine 20. The said flow delivery pipe or tubes or pipes 26 and the said flow return pipe or pipes or tubes or pipes 27 may also act vice versa so that the return pipe or tube may act as a delivery pipe or tube and so that the delivery pipe or tube 26 may act as a return flow pipe or tube.

It would also be possible to provide the wheel or wheels 29 also with a hydraulic motor or motors in order to drive them and it would also be possible to use a hydraulic motor like those of positions 28 for driving a propeller if the vehicle moves through water. Such modifications are possible depending on the actual situation and design.

The engines 18 and 19 are provided in the aircraft, helicopter or vehicle of FIGS. 3 and 4 in order to drive the propellers, in this case to drive the vertical propellers 50, 51, 52 and 53.

A flow of hydraulic fluid under pressure is produced by the engine 18 or a fluid flow producing combustion engine and is passed therefrom through the flow delivery pipe or tube 22 into and through the flexible pipe or tube connection 32 and therefrom through the flow delivery pipe or tube or fluid flow pipe or tube 38 to the hydraulic motor 46.

Inside of the hydraulic motor 46 a flow of fluid under pressure enters into the expanding working chambers of said hydraulic motor and thereby drives directly or indirectly a rotor or a shaft of said hydraulic motor 46. A propeller 50 is fastened on said shaft 7 of hydraulic motor 46 and rotates with the shaft 7 of the motor 46. The hydraulic flow leaves the oil motor 46 and flows thereafter through the fluid flow pipe or tube 39 into and through a flexible tube or hose 36 and out therefrom into and through the fluid flow pipe or tube 40. The said flow of hydraulic fluid leaves thereafter the said fluid flow pipe or tube 40 and enters into the hydraulic motor 47. In the hydraulic motor 47 the said flow of hydraulic fluid enters the expanding working chambers in the said hydraulic motor 47 and thereby provides directly or indirectly the rotation of the shaft 7 of the hydraulic motor 47. The propeller 51 is fastened on shaft 7 of hydraulic motor 47 and rotates therewith. Thereafter the flow of hydraulic fluid leaves the oil motor 47, enters the fluid flow pipe or tube 41 and flows through the fluid flow pipe or tube 41 into and through the flexible pipe connection 33 and out therefrom into and through the flow return pipe or tube 23 and out therefrom back into a tank or back into the hydraulic pump or pumps or into the fluid flow producing engine or combustion engine 18.

Thereby the cycle of the flow of fluid out of the engine and hydraulic pump or pumps or fluid flow producing engine or combustion engine 18 is closed and this cycle of flow of fluid continues as long as the engine or combustion engine and hydraulic pump or pumps or fluid flow producing engine 18 supplies a flow of hydraulic fluid under pressure.

A similar flow of hydraulic fluid in a similar cycle is produced in the engine 19. This said hydraulic flow of fluid under pressure leaves the hydraulic pump 19 and flows through the flow delivery pipe or tube 24 into and through the flexible pipe connection 34 and therefrom through the fluid flow pipe or tube 42 into the hydraulic motor 48.

Inside of the hydraulic motor 48 the flow of fluid under pressure enters into expanding working chambers of said motor forces the rotor with shaft 7 of said hydraulic motor 48 to revolve. The propeller 52 is fastened on the shaft 7 of hydraulic motor 48 and rotates therewith. The flow of fluid leaves the hydraulic motor 48 and enters into the fluid flow pipe or tube 43 and flows therethrough and thereafter into and through the flexible tube or hose 37 and through the fluid flow pipe or tube 44. Out from the fluid flow pipe or tube 44 the flow of hydraulic fluid enters into the hydraulic motor 49. Inside of the hydraulic motor 49 the flow of fluid under pressure enters into working chambers and forces thereby the rotor with its shaft 7 of the hydraulic motor 49 to revolve. Propeller 53 is fastened on shaft 7 of oil motor 49 and revolves therewith. The flow of fluid leaves the hydraulic motor 49 and enters into the fluid flow pipe or tube 45.

Thereafter the flow of fluid flows through the said fluid flow pipe or tube 45 into and through the flexible pipe connection 35 and therefrom into and through the flow return pipe or tube 25 and therefrom back into the tank or into said pump or pumps or fluid flow producing engine 19. Thereby, also this cycle of a flow of hydraulic fluid is closed and continues as long as the engine or fluid flow producing means 19 continues to deliver a flow of hydraulic fluid under pressure.

Since in accordance with the above, the same quantity of hydraulic fluid flows through hydraulic motor 46 as well as thereafter through the hydraulic motor 47, these two motors are running with equal or proportional rotary velocity similar to the oil motors 6 and 12 of FIGS. 1 and 2. The features which were described in the embodiment of FIGS. 1 and 2 apply therefore also to the embodiments of FIGS. 3 and 4. The same quantity of flow of fluid which flows through hydraulic motor 48 flows also thereafter through hydraulic motor 49 as will also be understood from the above description. Therefore also these two hydraulic motors are revolving with the same rotary velocity or with proportional velocity and the features which were described in the embodiment of FIGS. 1 and 2 apply also to oil motors 48 and 49 of FIGS. 3 and 4.

However, the embodiment of FIGS. 3 and 4 contains additional objects and features.

An important feature of FIGS. 3 and 4 is that the hydraulic motors and thereby the propellers of these motors are not driven by only one engine or combustion engine but instead by two separated engines and they are also driven by two separated cycles or flows of hydraulic fluid. Therefore, if one engine or pump would accidently be stopped then the other pump serving the other cycle of fluid will continously deliver a flow of fluid. If for example, the engine or pump 18 fails to deliver the required flow under pressure then the propellers 50 and 51 may come to rest and discontinue to lift or to bear the aircraft. The same would be the case if accidentally the hydraulic motor 46 or 47 or both of them would stop their operation. But on the other hand during the same time the engine or pump 19 would continue to deliver the fluid under pressure and therefore the hydraulic motors 48 and 49 and thereby the propellers 52 and 53 would continue to operate and would continue to bear or to move the aircraft through the air or continue to take off or land the vehicle. The same effect would be achieved if on the contrary the engine or pump 19 would fail to deliver a flow of hydraulic fluid under pressure and thereby propellers 52 and 53 would come to rest.

Then the engine or pump 18 would continue to deliver a flow of hydraulic fluid under pressure and the hydraulic motors 46 and 47 and thereby the propellers 50 and 51 would continue their operation and would continue to bear the vehicle in the air, i.e. to move the aircraft through the air or to continue to take off or land the aircraft or vehicle.

The provision of two cycles or two flows of hydraulic fluid or a plurality of flows of hydraulic fluid for driving a vertical, inclined or horizontal propellers of an aircraft or vehicle is therefore very safe and can prevent accidents and casualties.

It should be noted that the oil motors 48 and 49 with their propellers 52 and 53 are oppositionally located with respect to the passenger cabin or body of the aircraft. Therefore, if these two propellers are bearing the aircraft in the air then the weight of the passenger cabin and of the driving engine and pumps is substantially below and between the propellers 52 and 53 and therefore a stable location or movement of the aircraft or vehicle in or through the air is thereby assured.

Also the hydraulic motors 46 and 47 with their propellers 50 and 51 are located above and on opposite ends of the passenger cabin or body of the vehicle or aircraft 21. Therefore also if only hydraulic motors 46 and 47 with their propellers 50 and 51 would operate then the aircraft would be in a stabilized position in the air. A most stabilized rest or movement of the vehicle through the air is given if both flows of hydraulic fluid are operating and therefore all four hydraulic motors 46, 47, 48 and 49 with their propellers 50, 51, 53 and 52 are operating. The shafts 7 of the hydraulic motors of this embodiment may also have an inclination "alpha" similar to those of FIGS. 1 and 2.

An additional feature is demonstrated by the fact that the fluid flow pipes or tubes 38, 39, 40, 41, 42, 43, 44 and 45 can be swung upwards and/or downwards so that, if the said pipes are swung upwards, the hydraulic motors, the pipes or tubes and the propellers need very less space and so that the vehicle then can be used as a car for movement on land or as a boat for rest or movement on the water.

For this purpose the flexible pipe connections 32, 33, 34, and 35 are provided connecting in each case two pipes together and to provide their swing ability respective to each other around the axis of the flexible pipe connection means 32, 33 34 or 35. On those locations or spaces where no special pipe connection means are needed there are flexible tubes or hoses 36 or 37 provided between respective ends of fluid flow pipes or tubes.

The flexible tube or hose 36 connects the fluid flow pipe or tube 39 with the fluid flow pipe or tube 40. The flexible tube or hose 37 connects the end of the fluid flow pipe or tube 43 with the respective end of the fluid flow pipe or tube 44. The flexible tubes or hoses are of such a structure that a flow of hydraulic fluid under pressure can flow therethrough.

The flexible pipe connection means 32 connects an end of the fluid flow pipe or tube 38 with an end of the flow delivery pipe or tube 22. The flexible pipe connection 33 connects the fluid flow pipe or tube 41 with the flow return pipe or tube 23. The flexible pipe connection 34 connects the flow delivery pipe or tube 24 with the fluid flow pipe or tube 42 and the flexible pipe connection 35 connects the fluid flow pipe or tube 45 with the flow return pipe or tube 25.

The said flexible pipe connections 32, 33, 34, or 35 may be of a conventional design. In the enlargement of FIG. 4, is for example, there is shown the flexible pipe connection means like 32, 33, 34, 35.

In the enlargement, the end of the flow return pipe or tube 23 is shown and it is visible that the flow return pipe or tube 23 extends into the twin flow pipe or tube ends 123 and 223. Also visible in the enlargement is the fluid flow pipe or tube 41 which extends into its pipe or tube end 141. The pipe or tube end 141 enters into the space between the twin pipe or tube ends 123 and 223 of pipe or tube 23. Holes are provided through the pipe or tube ends 141 and 123 and 223. A connection cylinder 54 is inserted into the said holes and seals respectively between the wall of the connection cylinder 54 and the walls of the pipe or tube ends 141, 123, and 233. The pipes or tubes 23 or 41 and therewith the tube ends 141, 123 and 223 are able to swing around the axis of the connection cylinder 54.

Inside of the connection cylinder 54 is the passage means 55 provided. The passage means 55 has a connecting passage 355 through a part of the wall of the connection cylinder 54 and thereby provides the communication between the passage means 55 and the space in the pipe or tube 41. The passage means 155 and 255 extend from the passage means 55 through a part of the wall of the connection cylinder 54 and provide thereby the communication between the space in the pipe or tube 23 or its ends 123 or 223. Therefore a flow of fluid can flow from the space in the pipe or tube 23 through the passage means 155 and/or 255 into and through the passage means 55 and out therefrom through the passage means 355 into the space in the pipe or tube 41 or pipe extension 141. The flow may also flow vice versa, depending on the situation. The other flexible pipe connection means 32, 33, 34 and 35 may be of a similar or other suitable design or construction.

Since the pipes 23 and 41 can be swung around the axis of the connection cylinder 54 it is possible to swing the respective pipes or tubes upwards or downwards around said axis. If the said pipes or tubes are swung downwards then the clasp 31 may be provided between the passenger cabin or the body of the aircraft and a respective pipe or tube, for instance pipes or tubes 38 or 41 or 42 or 45, so that the upwards swing of the pipes or tubes is prevented and so that the body of the aircraft or the passenger cabin can be borne by the said flexible pipe connections 32, 33, 34 and 35 and/or the respective clasps 31.

The oil motors 46, 47, 48 and 49 may be directly fastened on the respective pipes and the propellers 50, 51, 52 and 53 may be fastened on shafts of the respective oil motors or otherwise be fastened or borne. The passenger cabin or the body of the aircraft 21 is borne below the pipes or tubes, hydraulic motors and propellers by the respective pipes or tubes or flexible pipe connections and/or the said clasps 31.

Figure 5:
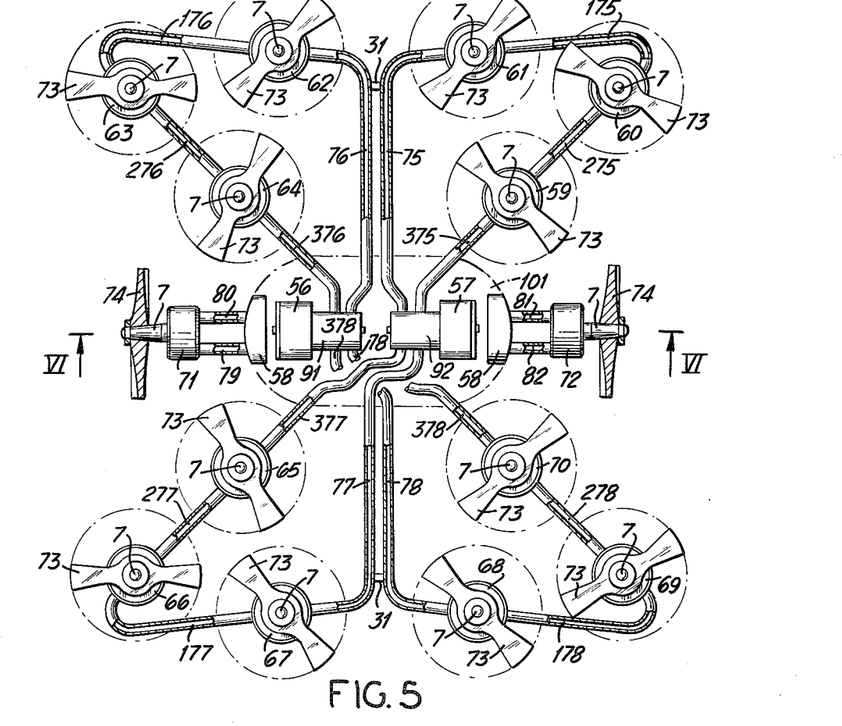
FIG. 5 shows a top view of another embodiment of an aircraft of this invention.
Figure 6:
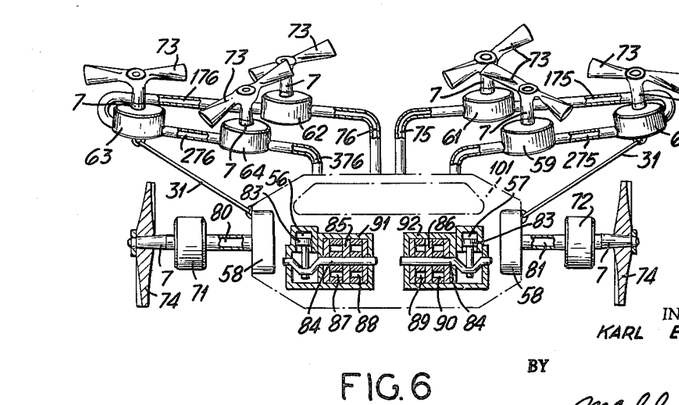
FIG. 6 shows longitudinal sectional view through the aircraft of FIG. 5 taken along the line VI—VI.

In the embodiment of an aircraft or vehicle of this invention of FIGS. 5 and 6 the passenger cabin or aircraft's or vehicle's body is cited by position 101. The embodiment of FIGS. 5 and 6 is in so far similar with the embodiment of FIGS. 3 and 4 as the vertical propellers of this aircraft are also driven by a plurality of flows of hydraulic fluid.

The engine and pump or fluid flow producing engine 58 provides a flow of fluid which flows through the tube or pipe 79 into the and through the hydraulic motor 71 and thereby provides the rotation of said hydraulic motor 71 with its shaft 7 and flows back through tube or pipe 80 into the tank or into the engine or pump or fluid flow producing engine 58. The flow may also be vice versa. Propeller 74 is borne on the shaft 7 of hydraulic motor 71 and revolves together with the rotor of hydraulic motor 71. Propellers 74 provide the horizontal movement of the vehicle through the air. On the oppositional end of the aircraft body 101 is also another engine and pump or fluid flow producing engine 58 provided and supplies a flow of hydraulic fluid under pressure through pipe or tube 81 into the hydraulic motor 72 wherein said flow of fluid provides the rotary movement of the rotor and shaft 7 of hydraulic motor 72.

The fluid may flow back through the tube or pipe 82 into the tank or into the pump or fluid flow producing engine 58. The flow of fluid may also be vice versa. Propeller 74 is fastened on shaft 7 of hydraulic motor 72 and revolves and rotates with said shaft. Propeller 74 may act as a breaking propeller in order to stop the aircraft if an object nears the aircraft or if the aircraft moves towards an object on ground or in the air. Propeller 74 on shaft 7 of hydraulic motor 72 may also act in order to drive the aircraft in the opposite direction through the air. It is therefore possible that one of the hydraulic motors 71 or 72 may be resting while the other operates or they may be both in operation or during vertical take off or landing both of them may be at rest depending on the situation. The engine and pumps or fluid flow producing engines 58 or the hydraulic motors 71 or 72 may be controlled by the pilot or they may be controlled by remote controls or by automatic controls and they may be automatically started and operated in the case of danger of accidents if the aircraft nears an object or if an object nears the aircraft.

The numeral 56 indicates an engine, in this case a combustion engine and a two flow pump. Engine 56 or other engines of this specification might also be a turbine, a jet engine, or another suitable power plant. Position 83 presents the engine piston which drives the crank shaft or engine shaft 84.

The engine shaft 84 drives the pump rotor 85 and a plurality of pumping chambers is provided inside of the two flow pump 91. The pumping chambers 87 are producing one flow of fluid while the pumping chambers 88 are producing another flow of fluid. In a preferred embodiment which is demonstrated in FIGS. 5 and 6 the delivery quantity and pressure of both flows of hydraulic fluid which are produced in the pumping chambers 87 and 88 of the two flow pump 91 are equal. But it should be understood that depending on the actual situation and on the actual design the delivery quantity and pressure might also be different or proportional depending on the situation.

Another combustion engine 57 is driven by the combustion engine piston 83. Piston 83 drives the engine crank shaft or engine shaft 84. A rotor 86 of a two flow pump 92 is driven by the engine shaft 84 and said rotor 86 revolves in the two flow pump 92 which is assembled on the axial end of the combustion engine 57. A plurality of pumping chambers 89 and 90 is provided in the two flow pump 92. The pumping chambers 89 are providing one flow of fluid under pressure while the pumping chambers 90 are providing another flow of fluid under pressure. In the embodiment here described both quantities and pressures of flows of fluid out of the two flow pump 92 are equal. Also equal are the quantities and pressures of the flows of hydraulic fluid which are produced in the two flow pump 91 and the two flow pump 92, if the rotary velocities of the rotors of both pumps are equal.

Therefore, all four flows of fluid which are produced in the pumping chambers 87, 88, 89 and 90 of the two flow pumps 91 and 92 might be or are equal in delivery or pressure if the combustion engines 56 and 57 are revolving with the same rotary velocity. The delivery quantity and the delivery pressure of the flows out of the pumping chambers 89 and 90 of the two flow pump 92 might be different from the flows of hydraulic fluid out from the pumping chambers 87 and 88 of the two flow pump 91 if the combustion engine or engines 56 and 57 are revolving with different angular velocity.

Instead of producing flows of hydraulic fluid with equal delivery quantity and pressure such flows might also be produced with different delivery quantity and pressure inside of the two flow pump 91 or inside the two flow pump 92 depending on the situation.

In the embodiment of FIGS. 5 and 6 the flows of hydraulic fluid which are produced in the two flow pump 91 are driving propellers which are located on opposite sides of the body or passenger cabin 101 of the aircraft or vehicle. The propellers revolve with the same rotary velocity and if they are of the same size and located symmetrically then the aircraft is stably borne in the air.

The flows of hydraulic fluid which are produced in the two flow pump 92 drive propellers which are located on opposite sides of the body or passenger cabin 101 of the aircraft.

Therefore each flow system, for example the system of hydraulic flows of fluid which is produced in the two flow pump 91 can bear the aircraft stable in the air. On the other hand the system of hydraulic flows of fluid which is produced in the two flow pump 92 can also bear the aircraft in the air and assure the stable rest, location or travel of the aircraft in or through the air. Thus, if one of the two flow pumps 91 or 92 is stopped by accident, then the other two flow pumps 91 or 92 might continue their operation and therefore the propellers located at opposite ends of the craft may bear it stable in the air and prevent accidents or crashings. Aircraft is used herein to refer to any fluid borne vehicle, which is driven or borne by propellers or rotors with substantially vertical, horizontal or inclined rotor axes or propeller axes.

If the combustion engine 56 operates, then the flow of hydraulic fluid which is produced in the pumping chambers 88 of the two flow pump 91 flows through the tube or pipe 76 into the hydraulic motor 62 and provides the rotation of the rotor with its shaft 7 therein. Propeller 73 is fastened on shaft 7 and revolves therewith. The flow of hydraulic fluid leaves the hydraulic motor 62 and flows thereafter through the tube or pipe 176 into the hydraulic motor 63. Inside of the hydraulic motor 63 the flow of hydraulic fluid provides the rotation of the rotor with shaft 7 of the oil motor 63. Propeller 73 is fastened on shaft 7 and revolves therewith. The said flow of hydraulic fluid leaves hydraulic motor 63, flows thereafter through the pipe or tube 276 and into the hydraulic motor 64. Therein the flow of hydraulic fluid provides the rotation of the rotor and of shaft 7 of hydraulic motor 64.

Propeller 73 is fastened on shaft 7 of hydraulic motor 64 and revolves with said shaft. The said flow of hydraulic fluid leaves the hydraulic motor 64 and flows back through the tube or pipe 376 into a tank or back into the working chambers 88 of the two flow pump 91.

At the same time the flow of hydraulic fluid which is produced in the pumping chambers 87 of the two flow pump 91 flows through the pipe or tube 78 into the hydrualic motor 68 and provides the rotation of the rotor with shaft 7 of hydraulic motor 68. Propeller 73 is fastened on shaft 7 of hydraulic motor 68 and revolves with said shaft. The same flow of hydraulic fluid leaves hydraulic motor 68 and flows thereafter through pipe or tube 178 into hydraulic motor 69. Inside of hydraulic motor 69 the flow of fluid under pressure provides the revolution of the rotor with shaft 7 of said hydraulic motor 69. Propeller 73 is fastened on shaft 7 of hydraulic motor 69 and revolves with said shaft. The flow of fluid leaves hydraulic motor 69 and flows thereafter through pipe or tube 278 into hydraulic motor 70 wherein said flow of fluid provides the rotation of the rotor and of shaft 7 of hydraulic motor 70. Propeller 73 is fastened on shaft 7 of hydraulic motor 70 and revolves with said shaft. Thereafter the said flow of hydraulic fluid leaves the hydraulic motor 70 and flows through the pipe or tube 378 back into the tank or into the working chambers 87 of the two flow pump 91.

The flow of hydraulic fluid which is created by working chambers 89 of two flow pump 92 leaves the two flow pump 92 and flows thereafter through the pipe or tube 75 into and through the hydraulic motor 61, therafter through pipe or tube 175 into and through hydraulic motor 60, thereafter through pipe or tube 275 into and through hydraulic motor 59 and thereafter through the pipe or tube 375 back into a tank or into the working chamber 89 of the two flow pump 92. While the said flow of fluid flows through the hydraulic motors 61, 60, and 59 said flow of fluid provides the revolving of the rotors in said hydraulic motors and thereby the rotation of the shafts 7 of hydraulic motors 61, 60 and 59. Propellers 73 are fastened on shafts 7 of hydraulic motors 61, 60 and 59 and resolve with said shafts of said motors. Since all three hydraulic motors 61, 60 and 59 are driven by the same flow of hydraulic fluid the shafts 7 of said motors are revolved with the same or with proportional rotary velocity.

The flow of hydraulic fluid which is produced in the pumping chambers 90 of the two flow pump 92 leaves the two flow pump 92 and flows thereafter through the pipe or tube 77 into and through hydraulic motor 67 thereafter through pipe or tube 177 into and through hydraulic motor 66, thereafter through pipe or tube 277 into hydraulic motor 65 and thereafter through pipe or tube 377 into a tank or back into the respective working chambers 90 of the two flow pump 92.

Inside of the hydraulic motors 67, 66 and 65 said flow of hydraulic fluid provides the rotation of the rotors and of shafts 7 of said hydraulic motors 67, 66 and 65. Propellers 73 are provided on the shafts 7 of the said hydraulic motors 67, 66 and 65. Since the hydraulic motors 67, 66 and 65 are driven by the same flow of hydraulic fluid, they are rotating with the same or proportional rotary velocity and so do the shafts 7 and the propellers 73 of hydraulic motors 67, 66 and 65.

Since the flows of hydraulic fluid which are produced in pumping chambers 87 and 88 of the two flow pump 91 are in this example substantially equal in delivery and pressure, the aircraft or vehicle can be stably borne in the air, land or during take off.

If on the other hand the aircraft is driven by all four flows of hydraulic fluid which are produced in the two flow pumps 91 and 92 then the sum of the sectional areas through the streams of air which are driven by the propellers of the hydraulic motors which are driven by said flows of fluid is very large and consequently the propellers are relatively less loaded and therefore operate in a very effective range. Under such conditions the aircraft will be borne very economically in the air and can also take off and land very economically. This is due to the known fact, that the efficiencies of propellers or air streams increase with the relation of the cross sectional area through the respective stream of the air or of the stream of air produced by a propeller to the load on the propeller or to the indirect or direct load on the air stream.

The horizontal propellers which are driven by the hydraulic motors 71 or 72 are driven by entirely different systems of flows of fluid in this embodiment and can therefore be independently operated.

Instead of driving the hydraulic motors 71 and 72 by independent flow systems it would also be possible to take a part of the hydraulic flows which are produced in the two flow pumps 91 or 92 to drive one or a plurality of propellers for horizontal movement of the aircraft or vehicle. Such part of the quantity of flow or of flows might be taken away from the flows of fluid which are produced in the two flow pumps 91 or 92 by suitable valves or controllers.

It would be suitable if such flow of fluid is taken away from the return flow pipes or tubes, for instance from the return pipes or tubes 375, 376, 377, or 378 by respective control valves or controller means.

In the embodiments discussed heretofore the aircraft, vehicle or helicopter is borne in the air by vertical propellers. But it would also be possible to provide the hydraulic motors, the pipe means and/or connection means of this invention on such air crafts which are borne by wings.

The numbers of hydraulic motors and of hydraulic flows or of hydraulic motors and of propellers which are shown in the embodiments of this invention are by way of example only. It is also possible to provide another number of hydraulic flows, another number of pumps or of combustion engines or of fluid flow producing engines or of hydraulic motors on aircrafts or vehicles.

It would also be possible to provide the systems which are disclosed in this invention on vehicles which move on land or on vehicles which move through water or on the surface or water.

The fastening of hydraulic motors or pipes or tubes is also by way of example only and shows the most simple and the most inexpensive arrangement of pipes, tubes, fluid flow producing devices and hydraulic motors. Instead of this it would also be possible to provide additional housings or casings on the vehicle and to provide additional means whereon the hydraulic motors might be fastened or borne.

The clasps 31 which are shown by way of example in the embodiments can also be replaced by other suitable connection or fastening means. Features or means of one embodiment may be applied to others and vice versa. Guiding wings or control wings might be applied to the aircrafts or vehicles of this invention if so desired by the actual design. Valves, controllers, remote controllers, hand controls or the like can be provided on the aircraft of this invention to govern either the horizontal or vertical movement or thrust of the propellers and they might be incorporated into one or more of the flows of hydraulic fluid, they may be provided on the pumps or motors to control the displacement volumes of working chambers therein or they may be applied for controlling the rotary velocity of the engines, pumps or motors.

The hydraulic pumps or motors which are cited in this specification may consist of conventional hydraulic pumps or motors or may consist of hydraulic pumps or motors according to my U.S. Patents 2,975,716 or 3,062,151 or 3,070,377 or 3,099,964 or 3,089,516 or of others of my patents in foreign countries or of others of my copending patent applications in the United States or in foreign countries. As far as hydraulic fluid flow producing engines or hydraulic fluid flow producing engines are cited in this patent specification they may be of conventional structure or they may correspond to my coopending U.S. Patent applications, Serial Numbers 123,384 or 296,583 or to my copending German Patent applications or to my copending applications in other countries. For example to my copending patent application in Australia No. 34,268 or to my copending Germany patent application, serial number not yet known to me.

The aircraft or vehicle which was described above provides a plurality of features. First of all the most important feature is, that the aircraft or vehicle can be borne by means which are driven by a plurality of hydraulic flows which might be produced in a plurality of pumps or fluid flow producing combustion engines so that the aircraft or vehicle according to this invention is very safe against accidents.

Another also very important feature is that the aircraft is borne stable in the air and if due to air pockets or other reasons the aircraft is moved out of its horizontal position in the air it will adjust itself into the horizontal position so that the travel or rest of this aircraft or vehicle is very safe and stable.

Another improvement is that this aircraft can be constructed by very simple, economical and inexpensive means. For instance, the pipes or tubes are much more inexpensive than wings or bodies of conventional aircrafts. The hydraulic motors cited in the patent specification are also very inexpensive and can be obtained for amounts which are many times more inexpensive than conventional aircraft gears or conventional helicopter or aircraft driving engines.

Another feature is that the aircraft or vehicle is compared to its lifting power relatively less in own weight. An important improvement is also, that the propellers can be of relatively less diameters and therefore be produced less strong and thereby less expensive.

Another improvement is that propellers which are less in diameter are more sure in operation than conventional helicopter blades with large diameters.

Also an important improvement is the fact that by the inexpensive means of this invention, the plurality of propellers, a very large volume of air can be grasped by the propellers and forced for vertical movement, thereby bearing the aircraft or vehicle very economically and very efficiently in the air, because it is known that as bigger as the diameter of the downwards moving flow of air is, as more economical becomes the upwards movement or the bearing of the vehicle or body in the air.

Another improvement is, that, if one engine or some engines or some hydraulic motors or pumps of an aircraft of this invention would fail to operate, that then another system of an engine and/or pump and hydraulic motors with propellers thereon would keep the aircraft in the air or would allow the aircraft for a safe landing.

The invention disclosed and claimed in this application is described at the hand of some embodiments, but it will be apparent to those skilled in the art that it is equally possible to do other modifications and it is also apparent that those skilled in the art may be able or are able to use the embodiments disclosed in this invention or parts of the embodiments which are disclosed in this invention in other kinds of machines or vehicles. It is intended that the patent shall cover by suitable expression in the appended claims whatever features of patentable novelty reside in this invention.

What I claim is:

1. A propulsion system for a fluid born vehicle such as an aircraft, or water vehicle, comprising fluid flow producing means, at least two positive displacement fluid motors each having a rotating shaft disposed substantially parallel to flow of fluid in which the vehicle is borne and with a rotating propulsion member secured thereto, and conduit means directly connecting said two fluid motors and said fluid flow producing means in series for directing fluid under pressure from said fluid flow producing means to each of said fluid motors in succession and to return the flow to said fluid flow producing means, whereby to rotate said fluid motor shafts and said rotating propulsion members at definite proportional angular speeds in dependence on the capacities of said fluid motors.

2. An aircraft comprising a body, fluid flow producing means mounted on said body, a plurality of positive displacement hydraulic motors each having a rotatable shaft with a rotating rotor member thereon, and conduit means for passing at least one flow of fluid from said fluid flow producing means to a first of said hydraulic motors and from said first hydraulic motor to a second and so on directly back to said fluid flow producing means for rotating the shaft of said motors with proportional angular velocity in a closed fluid pressure system.

3. A helicopter comprising a body, first and second positive displacement fluid motors mounted on said body at spaced locations, each of said fluid motors having a rotating shaft with a rotating rotor thereon, fluid flow producing means carried by said body, and conduit means directly connecting said fluid flow producing means and said first and second fluid motors in series for directing fluid under pressure from said fluid flow producing means to said first fluid motor and then to said second fluid motor and back to said fluid flow producing means, said fluid flow producing means producing a uniform flow of fluid under pressure to said first and second fluid motors for rotating said fluid motors at definite proportional angular speeds.

4. A helicopter comprising a body, first and second positive displacement fluid motors mounted on said body at spaced locations, each of said fluid motors having a rotating shaft with a rotating rotor, fluid flow producing means carried by said body, and conduit means directly connecting said fluid flow producing means and said first and second fluid motors in series for directing fluid under pressure from said fluid flow producing means to said first fluid motor and then to said second fluid motor and back to said fluid flow producing means, said fluid flow producing means producing a uniform flow of fluid under pressure to said first and second fluid motors for rotating said rotors at proportional angular speeds, said conduit means including a conduit extending across the top of said body and secured to said body.

5. An aircraft such as a helicopter comprising a body, first and second positive displacement fluid motors mounted on said body at spaced locations, each of said fluid motors having a rotating shaft with a rotating propulsion member thereon, fluid flow producing means carried by said body, and conduit means directly connecting said fluid flow producing means and said first and second fluid motors in series for directing fluid under pressure from said fluid flow producing means to said first fluid motor and then to said second fluid motor and back to said fluid flow producing means, said fluid flow producing means producing a uniform flow of fluid under pressure to said first and second fluid motors for rotating said fluid motors at definite proportional angular speeds, said first motor being located at one end of said body, said second fluid motor being located at the opposite end of said body and each having shafts with axes disposed substantially vertically.

6. An aircraft according to claim 5, wherein said fluid motor shafts are disposed at an angle from the vertical and are directed inwardly toward the center of the body.

7. A vehicle such as an aircraft, land or water vehicle comprising a body, first and second positive displacement fluid motors mounted on said body at spaced locations, each of said fluid motors having a rotating shaft with a rotating propulsion member thereon, fluid flow producing means carried by said body, conduit means directly connecting said fluid flow producing means and said first and second fluid motors in series for directing fluid under pressure from said fluid flow producing means to said first fluid motor and then to said second fluid motor and back to said fluid flow producing means, said fluid flow producing means producing a uniform flow of fluid under pressure to said first and second fluid motors for rotating said fluid motors at definite proportional angular speeds, said first and second fluid motors being located at opposite ends of said body and including third and fourth positive displacement fluid motors located at opposite sides of said body, separate additional fluid flow producing means, and separate additional conduit means connecting said separate additional fluid flow producing means and said third and fourth fluid motors in series for directing fluid under pressure from said separate additional fluid flow producing means to each of said third and fourth fluid motors in succession and to return the fluid to said separate additional fluid flow producing means.

8. An aircraft comprising a body, first and second positive displacement fluid motors mounted on said body at spaced locations, each of said fluid motors having a rotating shaft with a rotating propulsion member thereon, fluid flow producing means carried by said body, conduit means directly connecting said fluid flow producing means and said first and second fluid motors in series for directing fluid under pressure from said fluid flow producing means to said first fluid motor and then to said second fluid motor and back to said fluid flow producing means, said fluid flow producing means producing a uniform flow of fluid under pressure to said first and second fluid motors for rotating said fluid motors at proportional angular speeds, and separate fluid flow producing means, a third positive displacement fluid motor, said third fluid motor having a rotatable shaft with a wheel thereon, said separate fluid flow producing means being connected to said third fluid motor for causing rotation of the shaft thereof.

9. A vehicle such as an aircraft, land or water vehicle comprising a body, first and second positive displacement fluid motors mounted on said body at spaced locations, each of said fluid motors having a rotating shaft with a rotating propulsion member thereon, fluid flow producing means carried by said body, and conduit means directly connecting said fluid flow producing means and said first and second fluid motors in series for directing fluid under pressure from said fluid flow producing means to said first fluid motor and then to said second fluid motor and back to said fluid flow producing means, said fluid flow producing means producing a uniform flow of fluid under pressure to said first and second fluid motors for rotating said fluid motors at proportional angular speeds, said first and second fluid motors being located on opposite sides of said body, third and fourth positive displacement fluid motors located on each end of said body each having a shaft disposed for rotation about a substantially horizontal axis and a propeller affixed at each of said shafts for rotation therewith, second and third fluid flow producing means and second and third conduit means connected between respective second and third fluid flow producing means and said third and fourth motors for directing fluid under pressure to said motors for rotating the propellers of said motors.

10. A helicopter comprising a body, first and second positive displacement fluid motors mounted on said body at spaced locations, each of said fluid motors having a rotating shaft with a rotating rotor thereon, fluid flow producing means carried by said body, and conduit means directly connecting said fluid flow producing means and said first and second fluid motors in series for directing fluid under pressure from said fluid flow producing means to said first fluid motor and then to said second fluid motor and back to said fluid flow producing means, said fluid flow producing means producing a uniform flow of fluid under pressure to said first and second fluid motors for rotating said fluid motors at proportional angular speeds, and at least one additional positive displacement fluid motor mounted on said body and having a rotating shaft with a rotating rotor member thereon, at least one additional flow producing means carried by said body, and additional conduit means connecting said additional fluid flow producing means and said additional fluid motor for directing fluid under pressure from said additional flow producing means to said additional fluid motor for rotating said additional rotating rotor member.

11. An aircraft such as a helicopter or vertical take-off and landing aircraft comprising a body, first and second positive displacement fluid motors mounted on said body at spaced locations, each of said fluid motors having a rotating shaft with a rotating propulsion member thereon, fluid flow producing means carried by said body, conduit means directly connecting said fluid flow producing means and said first and second fluid motors in series for directing fluid under pressure from said fluid flow producing means to said first fluid motor and then to said second fluid motor and back to said fluid flow producing means, said fluid flow producing means producing a uniform flow of fluid under pressure to said first and second fluid motors for rotating said fluid motors at proportional angular speeds, said first motor being located at one end of said body, said second fluid motor being located at the opposite end of said body and each having shafts with axes disposed substantially vertically, at least one additional positive displacement fluid motor mounted on said body and having a rotating shaft with a rotating rotor member thereon, at least one additional flow producing means carried by said body, and additional conduit means connecting said additional fluid flow producing means and said additional fluid motor for directing fluid under pressure from said additional flow producing means to said additional fluid motor for rotating said additional rotating rotor member.

References Cited by the Examiner
UNITED STATES PATENTS

| | | | |
|---|---|---|---|
| 2,361,098 | 10/44 | Higby | 60—53 |
| 2,514,822 | 7/50 | Wolfe | 244—17.17 X |
| 2,651,480 | 9/53 | Pullin | 244—17.23 |
| 2,940,688 | 6/60 | Bland | 244—2 |

FERGUS S. MIDDLETON, *Primary Examiner.*